United States Patent [19]

Yamada et al.

[11] Patent Number: 5,148,309
[45] Date of Patent: Sep. 15, 1992

[54] REFLECTIVE TYPE SCREEN

[75] Inventors: Chihiko Yamada, Tokyo; Teruo Suzuki, Ageo; Tsutomu Yoshida, Matsudo; Shinji Kubota, Ohmiya, all of Japan

[73] Assignee: Toppan Printing Co., Ltd., Tokyo, Japan

[21] Appl. No.: 805,155

[22] Filed: Dec. 11, 1991

[30] Foreign Application Priority Data

| Dec. 14, 1990 | [JP] | Japan | 2-410935 |
| Mar. 29, 1991 | [JP] | Japan | 3-92734 |
| Mar. 29, 1991 | [JP] | Japan | 3-92735 |
| Apr. 18, 1991 | [JP] | Japan | 3-112125 |

[51] Int. Cl.$^5$ ............................................. G03B 21/56
[52] U.S. Cl. ........................................................ 359/443
[58] Field of Search ................... 359/443, 449, 601, 48

[56] References Cited

U.S. PATENT DOCUMENTS

| 3,507,548 | 4/1970 | Hoffmann et al. | 359/443 |
| 3,653,740 | 4/1972 | Ogura et al. | 359/443 |
| 3,811,750 | 5/1974 | Coulthard | 359/443 |
| 4,025,160 | 5/1977 | Martinez | 359/443 |
| 4,201,449 | 5/1980 | Campion et al. | 359/443 |
| 4,436,377 | 3/1984 | Miller | 359/48 |
| 4,652,084 | 3/1987 | Daszinnies | 359/443 |

*Primary Examiner*—Richard A. Wintercorn
*Attorney, Agent, or Firm*—Armstrong, Nikaido, Marmelstein, Kubovcik & Murray

[57] ABSTRACT

A reflective type screen comprising a reflective surface layer a polarizing plate layer located in front of said reflective surface layer and a diffusion layer located in front of the polarized plate layer, wherein the reflective surface layer, the polarizing plate layer and the diffusion layer are laminated together using an adhesive to form an integral structure is disclosed. In addition, a reflective type screen comprising a reflective surface layer subjected to mirror-surface processing and laid on a flexible substrate, a polarizer and a diffusion layer arranged for covering the polarizer therewith wherein the reflective surface layer, the polarizer and the diffusion layer are laminated together using an adhesive to form an integral structure is disclosed. Additionally, a reflective type screen comprising a polarizer a protective layer located in front of the polarizer for protecting the polarizer and adhesively secured to the polarizer, a surface of the protective layer located on the incident side being subjected to diffusion processing, and another protective layer located behind the polarizer for protecting the polarizer and adhesively secured to the polarizer, a surface of the protective layer located on the incident side being subjected to mirror-surface processing, wherein the polarizer, the protective layer and the another protective layer are laminated together using an adhesive to form an integral structure is disclosed.

4 Claims, 4 Drawing Sheets 2 3 7 10

12 g 7 11

2 3

41 40

REFLECTIVE TYPE SCREEN

BACKGROUND OF THE INVENTION

1. Field of the Invention

The present invention relates generally to a reflective type screen preferably employable for a projector such as a video projector or the like. More particularly, the present invention relates to a reflective type screen which assures that an enlarged image projected under a bright visual circumstance can clearly be displayed with a high optical contrast.

2. Description of the Related Art

To facilitate understanding of the present invention, a conventional reflective type screen will be described below with reference to FIG. 8 and FIG. 9. First, referring to FIG. 8, the reflective type screen 1 preferably employable for a projector includes a reflective surface layer 3 usually molded of a white polyvinyl cellulose film, and the reflective surface layer 3 is laid on the upper surface of a substrate 2. The surface of the reflective surface layer 3 is subjected to diffusion processing and then coated with a certain agent effective for preventing the reflective surface layer 3 from being undesirably contaminated with foreign materials. When the screen 1 is practically used, an image is projected on the screen 1 in a dark room without any invasion of exterior light into the dark room.

With respect to the conventional reflective type screen having a white polyvinyl cellulose film used therefor as mentioned above, any image should be projected on the screen in the dark room. In view of this fact, in recent years, a trial has been made so as to enable a projected image to be visually observed by viewers in a light room, as disclosed in an official gazette of, e.g., Japanese Unexamined Publication Patent (Kokai) NO. 62-266980. According to the prior invention, a light irradiated from a projector is projected onto the screen through a polarizing filter. The screen includes a polarizing plate having a permeation axis extending in the same polarization direction as that of the polarizing filter. In addition, the screen includes a reflective surface so as to allow the reflected light to be reflected therefrom while maintaining the same polarized state as that of an incident light. The arrangement of the polarizing plate and the reflective surface in the above-described manner makes it possible that reflection of an exterior light is substantially suppressed over the surface of the screen so that the exterior light reflected from the surface of the screen is not visually recognized by the viewers.

Additionally, referring to FIG. 9, the reflective type screen 1 is constructed in a laminated structure and includes a polarizing plate layer 40 and a stereo screen 41 as seen from the incident side wherein an incident light is irradiated in the A arrow-marked direction in the drawing. Both the layers 40 and 41 are adhesively secured to each other to form an integral structure.

It has been required from the viewpoint of a role of the reflective type screen that a light irradiated from the projector is expansively diffused with a wide angle (predetermined angle) so that an image on the screen can be observed by many viewers with uniform brightness. To meet the requirement, the surface of the screen should be prepared in the form of a diffusion surface.

However, since the conventional reflective type screen is constructed such that a reflective surface layer is arranged on the rear surface of a polarizing plate layer and both the layers are prepared in the form of a flat and smooth surface, an incident light is reflected from the flat and smooth surfaces as if it is reflected from a mirror surface. Thus, there arises a problem that an image on the screen can not properly be observed by a part of the viewers (who stay on both the sides as seen from the screen) because the incident light is not expansively diffused with a wide angle.

SUMMARY OF THE INVENTION

The present invention has been made with the foregoing background in mind.

An object of the present invention is to provide a reflective type screen which assures that a reflected light is expansively diffused without deterioration of effective functions derived from arrangement of a polarizing plate layer on the screen.

Another object of the present invention is to provide a reflective type screen which assures that an image projected thereon with a polarized light can clearly visually observed by many viewers.

According to a first aspect of the present invention, there is provided a reflective type screen comprising a reflective surface layer to which an incident light containing a polarized light is irradiated and from which the reflected light having the same polarization direction as that of the incident light is irradiated to build a projected image; a polarizing plate layer located in front of the reflective surface layer and having a permeation axis extending in the same direction as the polarization direction of the incident light; and a diffusion layer located in front of the polarized plate layer; wherein the reflective surface layer, the polarizing plate layer and the diffusion layer are laminated together to form an integrated structure.

According to a second aspect of the present invention, there is provided a reflective type screen comprising a reflective surface layer to which an incident light containing a polarized light is irradiated and from which the reflected light having the same polarization direction as that of the incident light is irradiated to build a projected image; a polarizing plate layer located in front of the reflective surface layer and having a permeation axis extending in the same direction as the polarization direction of the incident light, the polarizing plate layer being composed of two layers of polarizing plates each having a same permeation axis; and a diffusion layer located in front of the polarizing plate layer; wherein the 5 reflective surface layer, the polarizing plate layer and the diffusion layer are laminated together to form an integral structure.

According to a third aspect of the present invention, there is provided a reflective type screen comprising a reflective surface layer subjected to mirror-surface processing and laid on a flexible substrate; a polarizer having a permeation axis extending in the same direction as the polarization direction of an incident light containing a polarized light, the incident light being reflected therefrom to build a projected image; and a diffusion layer arranged for covering the polarizer therewith; wherein the reflective surface layer, the polarizer and the diffusion layer are laminated together to form an integral structure.

According to a fourth aspect of the present invention, there is provided a reflective type screen comprising a polarizer having a permeation axis extending in the same direction as the polarization direction of an incident light containing a polarized light, the incident light being reflected therefrom to build a projected image; a protective layer located in front of the polarizer for protecting the polarizer and adhesively secured to the polarizer, a surface of the protective layer located on the incident side being subjected to diffusion processing; and another protective layer located behind the polarizer for protecting the polarizer and adhesively secured to the polarizer, a surface of the another protective layer located on the incident side being subjected to mirror-surface processing; wherein the polarizer, the protective layer and the another protective layer are laminated together to form an integral structure.

With the reflective type screen constructed according to the first aspect of the present invention, as an incident light containing a polarized light permeates through the diffusion layer, a reflection angle of the reflected light is enlarged. In other words, the reflected light is transformed into a diffused light.

With the reflective type screen constructed according to the second aspect of the present invention, since the polarizing plate layer is composed of two layers of polarizing plates to assume a laminated structure, any other light rather than the light irradiated from a projector is substantially attenuated by the polarizing plate layer so that it is reflected from the screen in an attenuated state through the double-layered polarizing plate layer. On the contrary, the light irradiated from the projector is not attenuated by the polarizing plate layer. In other words, an image built by the light irradiated from the projector is not attenuated by the polarized plate layer. Thus, the light irradiated from the projector is correctly reflected to the viewer side without any occurrence of attenuation.

With the reflective type screen constructed according to the third aspect of the present invention, since the polarizer is interposed between the diffusion layer and the flexible substrate, the whole screen becomes flexible, enabling it to be wound in the form of a roll.

With the reflective type screen constructed according to the fourth aspect of the present invention, the protective layer located on the fore surface side of the polarizer exhibits a light diffusing function, while the protective layer located on the rear surface side of the same exhibits a light reflecting function owing to the mirror-surface processing given to the protective layer located on the rear surface side of the polarizer. In addition, since the reflective surface layer is subjected to hair-line processing in the upward/downward direction, the reflected light is substantially expanded in the leftward/rightward direction.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to FIG. 1 to FIG. 7 which illustrate preferred embodiments of the present invention.

Figure 1:
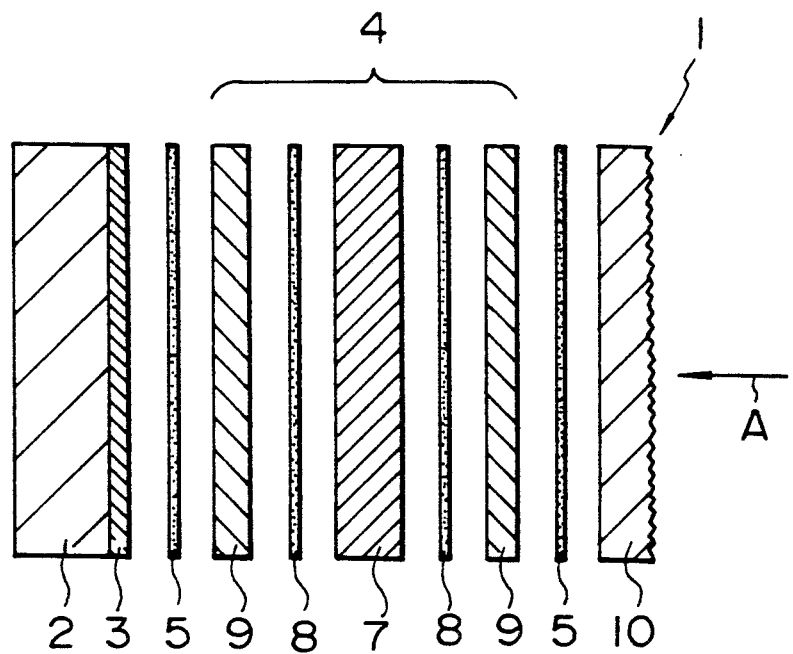
FIG. 1 is a sectional view of a reflective type screen in accordance with a first embodiment of the present invention, particularly illustrating the structure of the screen in a disassembled state.

FIG. 1 is a sectional view of a reflective type screen in accordance with a first embodiment of the present invention, particularly illustrating the laminated structure of the screen 1 in a disassembled state. Specifically, the screen 1 includes as essential components a reflective surface layer 3 of an aluminum foil placed on a substrate 2 molded of a synthetic resin such as a polyethylene terephthalate or the like, a polarizing plate layer 4 located in front of the reflective surface layer 3 and a diffusion layer 10 of a diffusion sheet so as to form a laminated integral structure while a tackifier layer 5 is interposed between the reflective surface layer 3 and the polarizing plate layer 4 and another tackifier layer 5 is interposed between the polarizing plate layer 4 and the diffusion layer 10.

The reflective surface layer 3 is constructed such that an incident light containing a polarized light is irradiated thereto and the reflected light is reflected therefrom in the same direction as that of the incident light. To this end, a sheet material exhibiting a metallic surface appearance with an aluminum film deposited on the substrate 2 may be employed in place of the aluminum foil as mentioned above. In addition, the reflective surface layer 3 is subjected to hair-line processing to form a number of hair lines each extending in the upward/downward direction relative to the screen 1, whereby a diffusion angle of the reflected light in the leftward/rightward direction can be enlarged much more than the diffusion angle of the same in the upward/downward direction.

The diffusion sheet constituting the diffusion layer 10 is subjected to diffusion processing by mechanically or chemically processing the surface of a film molded of, e.g., a triacetyl cellulose film (TAC) to form a mat surface.

The polarizing plate surface 4 has a permeation axis (not shown) which coincides with the direction of polarization of the incident light irradiated from the projection side. Thus, the incident light and the reflected light irradiated in the polarization direction can permeate through the polarizing plate layer 4. As shown in FIG. 1, the polarizing plate layer 4 is constructed such that a polarizer 7 molded of, e.g., a polyvinyl cellulose film having an iodine adsorbed thereto is interposed between opposite base layers 9 each molded of a triacetyl cellulose film (TAC) and an adhesive layer 8 is interposed between the polarizer 7 and each of the base layers 9 so as to form a laminated integral layer.

Since the screen 1 is constructed in the above-described manner, an incident light containing a polarized light to be projected thereto so as to form an image thereon is reflected in the form of a reflected light adapted to diffuse with a wide angle but other general exterior light is substantially absorbed in the polarizing plate layer 4. Thus, the projected image can visually be observed by many viewers. In contrast with the conventional screen, since an exterior light functioning to reduce an optical contrast is absorptively removed by the polarizing plate layer 4, the projected image can visually be observed by them with an improved optical contrast. Additionally, since a dark part on the projected image is recognized with an amplified black tone even in a dark room, an image having an excellent optical contrast can be built on the screen 1 even in a light room.

Figure 2:
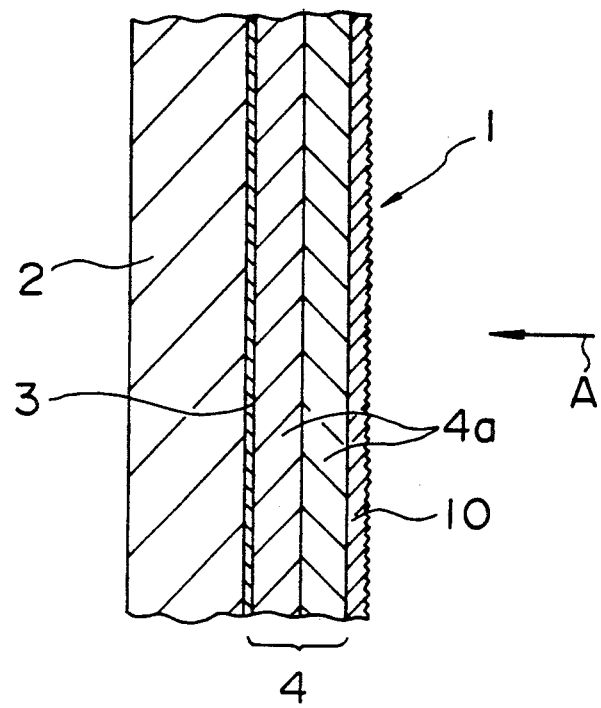
FIG. 2 is a fragmentary sectional view of a reflective type screen in accordance with a second embodiment of the present invention, particularly illustrating that the screen includes a polarized plate layer composed of double layers of polarizing plates.

FIG. 2 is a fragmentary sectional view of a reflective type screen 1 in accordance with a second embodiment of the present invention. As is apparent from the drawing, the screen 1 includes a polarizing plate layer 4 which is composed of two laminated polarizing plates 4a. Each of the laminated polarizing plates 4a has a same permeation axis. In other words, the permeation axis of each of the polarized plates 4a is oriented in the same direction as that of the permeation axis of a polarized light generated in a projector. It should be noted that illustration of tackifier layers is neglected for the purpose of simplification.

With the screen 1 constructed as described above, since an exterior light is substantially canceled therewith, an image projected by the projector can clearly visually be observed by many viewers. As a result, an image having an optical contrast higher than that of the screen 1 in accordance with the first embodiment of the present invention shown in FIG. 1.

Figure 3:
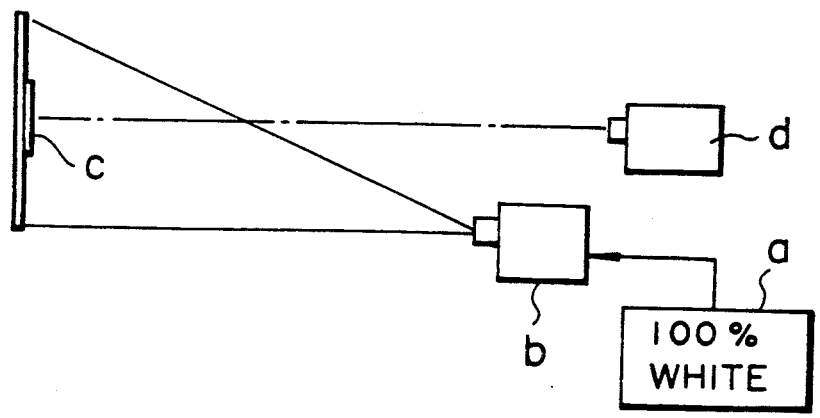
FIG. 3 is an illustrative view which schematically shows the structure of a measuring system for measuring a SG value.

FIG. 3 is an illustrative view which schematically shows the structure of a measuring system for measuring a SG value. In the shown system, an image a having 100% whiteness is projected by a projector b to have a size of 100 inches. Then, to measure a brightness value on the surface of a screen, a brightness meter d is displaced in the leftward/rightward direction by an angle of ±60 degrees relative to the front surface of a screen c arranged at the central part of a projection surface. It should be noted that measurement are conducted in a dark room.

Figure 4:
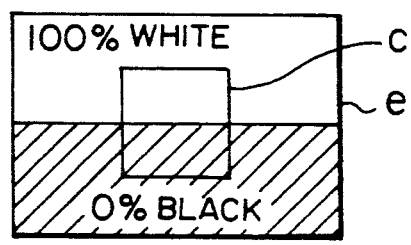
FIG. 4 is an illustrative view which schematically shows that an optical contrast is measured.

FIG. 4 is an illustrative view which shows that an optical contrast is measured by the brightness meter d. An image e having 100% whiteness and 0% blackness as seen in the upward/downward direction is projected on the screen c by the projector b to have a size of 100 inches so that a brightness value is measured on the front surface of the screen located at the central part of the projected 0 surface. The optical contrast is calculated in accordance with the following equation.

optical contrast=brightness on the white part/brightness on the black part

Figure 5:
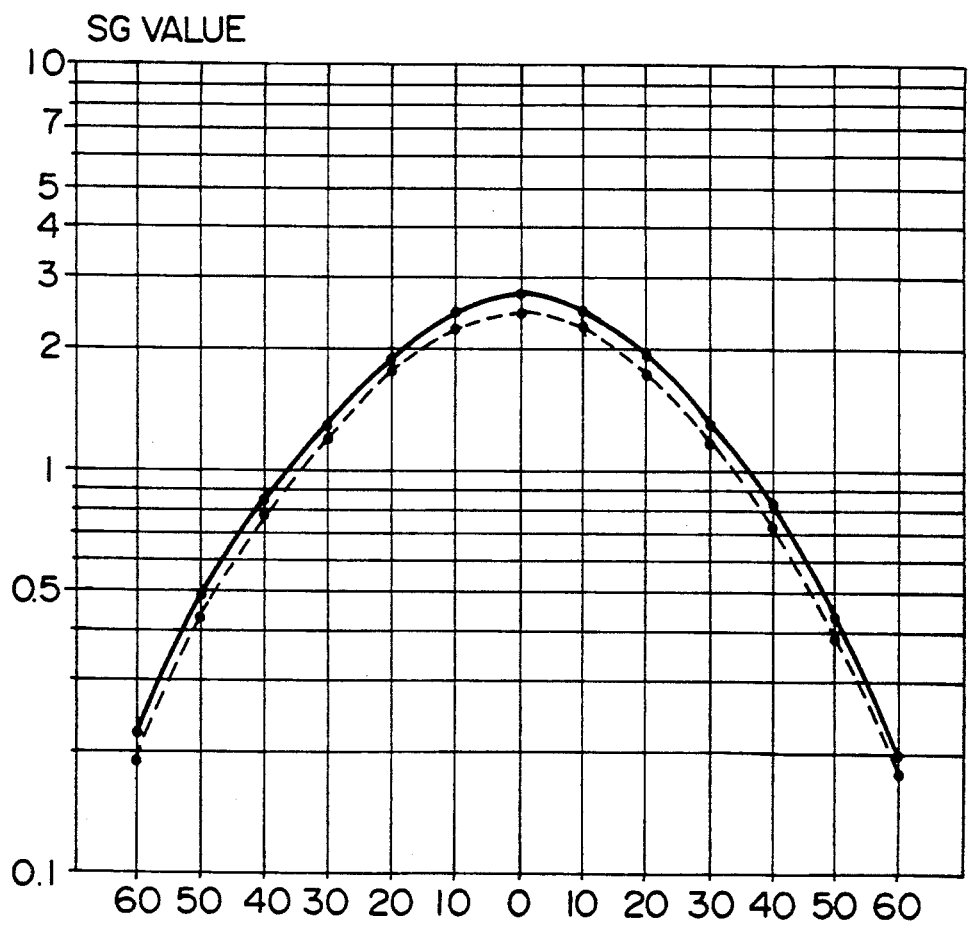
FIG. 5 is a diagram which shows a comparison between a reflective type screen including a single layer of polarizing plate and a reflective type screen including double layers of polarizing plates by way of a series of SG values.

FIG. 5 is a graph which shows a comparison between a reflective type screen including a polarizing plate layer composed of a single layer of polarizing plate and a reflective type screen including a polarizing plate layer composed of double layers of polarizing plates in conjunction with the measurement of contrast as mentioned above. The results derived from measurements conducted in a case where the polarizing plate is composed of a single-layered screen are represented by a solid line, while the results derived from measurements conducted in a case where the polarizing plate is composed of a double-layered screen. It was found from the results derived from the measurements that the optical contrast amounted to 65.3 in the case where the polarized plate was composed by a single-layered screen, while it amounted to 112.30 in the case where the polarizing plate was composed of a double-layered screen.

In addition, it was found from the foregoing fact that in the case where the polarizing plate was composed of a double-layered screen, a high SG value substantially equal to that in the case the polarizing plate was composed of a single-layered screen could be obtained and that an optical contrast in the former case became clear much more than that in the latter case.

As a result, with the reflective type screen of the present invention constructed in the above-described manner, an image having a high optical contrast can be obtained without any reduction of the brightness value.

Figure 6:
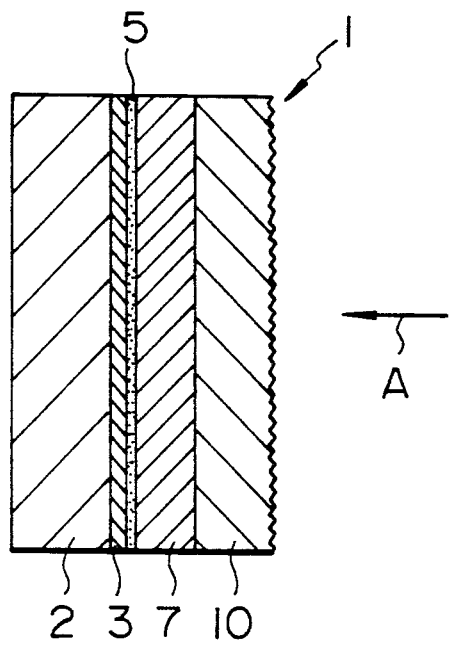
FIG. 6 is a sectional view of a reflective type screen in accordance with a third embodiment of the present invention.

Alternatively, the reflective type screen of the present invention may be constructed in accordance with a third embodiment as illustrated in FIG. 6. In the third embodiment, the screen 1 is constructed such that a polarizer 7 is adhesively secured to a reflective surface layer 3 on a flexible substrate 2 with a tackifier layer 5 interposed therebetween, and moreover, the polarizer 7 is coated directly with a diffusion layer 10 by employing a chemical coating process. It should be noted that one surface of the reflective surface layer 3, i.e., the right-hand surface of the same as seen in the drawing is subjected to mirror-surface processing by using a deposited aluminum film, an aluminum foil or the like.

To practice the chemical coating process, e.g., a varnish containing a diffusion agent is used to form the diffusion layer 10. In addition, the diffusion layer 10 may be formed by adhesively securing a material such as a varnish or the like directly to the polarizer 7.

As desired, the diffusion layer 10 may be formed such that the polarizer 7 is previously coated with an adhesive layer, and thereafter, a chemical coating operation or an adhering operation is performed to finish preparation of the diffusion layer 10.

In this case, a base layer for the polarized plate in not required, resulting in the number of layers being reduced. Thus, the screen 1 has flexibility which assure that the whole screen can be wound to exhibit a shape of roll. In other words, the screen 1 can be handled easily.

Figure 7:
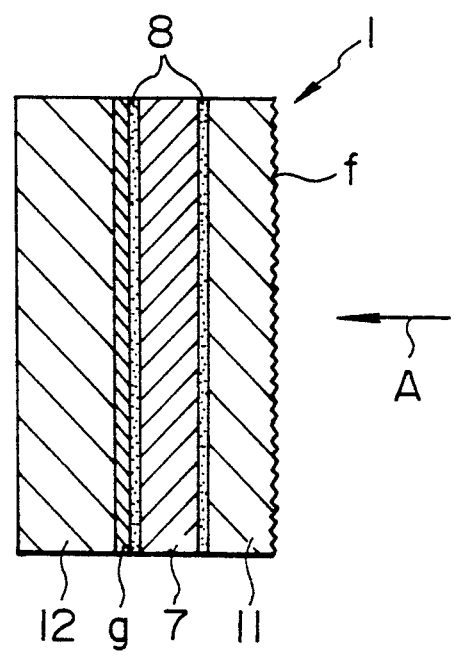
FIG. 7 is a sectional view of a reflective type screen in accordance with a fourth embodiment of the present invention.
Figure 8:
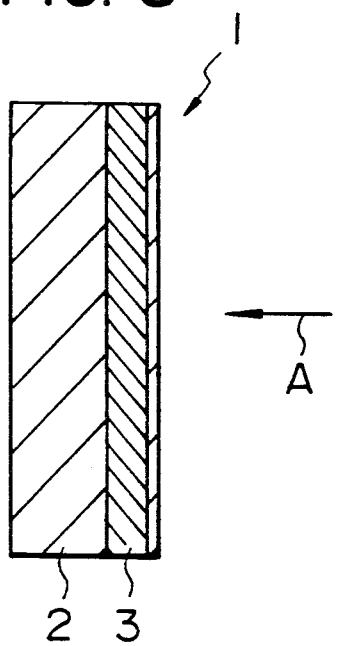
FIG. 8 is a sectional view of a conventional reflective type screen.
Figure 9:
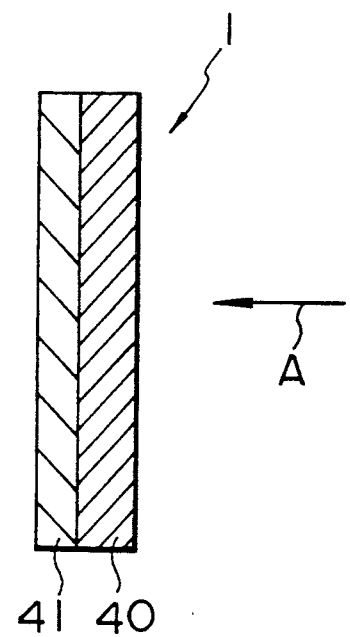
FIG. 9 is a sectional view of another conventional reflective type screen.

In addition, the reflective type screen of the present invention may be constructed in accordance with a fourth embodiment as illustrated in FIG. 7. In the fourth embodiment, the screen 1 is constructed such that a protective layer 11 having an optical diffusion function but not having an optical anisotropy such as double refractivity, optical rotary power or the like is adhesively secured to the fore surface of the polarizer 7 with an adhesive layer 8 interposed therebetween, and moreover, another protective layer 12 having an optical reflective function obtainable from a mirror surface is adhesively secured the rear surface of the polarizer 7 with an adhesive layer 8 interposed therebetween.

For example, a triacetyl cellulose film can be employed for the protective layer 11, and one surface of the film on the light incident side, i.e., the right-hand surface of the same as seen in the drawings is subjected to light diffusion processing f by employing, e.g., a mat processing process.

For example, a polyethylene terephthalate film can be employed for the protective layer 12. In this case, one surface of the film on the light incident side, i.e., the left-hand surface of the same as seen in the drawing is coated with an aluminum film by employing a vacuum aluminum depositing process to form a mirror surface g, causing the reflected light to be irradiated therefrom while maintaining the direction of polarization of the incident light. Since the protective layer 12 has a heavy thickness, it functions not only as a supporting member for the deposited aluminum surface but also as a substrate for the screen 1.

According to the fourth embodiment of the present invention, the number of steps required for production of the reflective type screen can be reduced, resulting in a production efficiency being improved substantially. Specifically, in contrast with the first embodiment of the present invention wherein the reflective type screen is constructed in the laminated structure having six layers, the number of adhering operations can be reduced by two steps. This leads to the result that a production cost can remarkably be lowered by reduction of the number of production steps as well as reduction of a quantity of consumed materials. In addition, since the protective layer located in front of the polarizer has a light diffusing function, employment of the light diffusion sheet can be neglected. Additionally, an utilization rate of light can be improved by reducing the number of layers through which an incident light is irradiated to the polarizer and the reflected light is irradiated therefrom.

As is apparent from the above description; since the reflective type screen is constructed with a small number of layers, the present invention offers many advantageous practical effects, because the screen is constructed to have a thin thickness and a light weight, and moreover, it can be wound in the form of roll.

While the present invention has been described above with respect to four preferred embodiments thereof, it should of course be understood that the present invention should not be limited only to these embodiments but various changes or modifications may be made without departure from the scope of the invention as defined by the appended claims.

What is claimed is:

1. A reflective type screen comprising;
   a reflective surface layer to which an incident light containing a polarized light is irradiated and from which the reflected light having the same polarization direction as that of said incident light is irradiated to build a projected image,
   a polarizing plate layer located in front of said reflective surface layer and having a permeation axis extending in the same direction as the polarization direction of said incident light, and
   a diffusion layer located in front of said polarizing plate layer
   wherein said reflective surface layer, said polarizing plate layer and said diffusion layer are laminated together to form an integral structure.

2. The reflective type screen as claimed in claim 1, wherein said polarizing plate layer is composed of two layers of polarizing plates each having a same permeation axis.

3. A reflective type screen comprising;
   a reflective surface layer subjected to mirror-surface processing and laid on a flexible substrate,
   a polarizer having a permeation axis extending in the same direction as the polarization direction of an incident light containing a polarized light, said incident light being reflected therefrom to build a projected image, and
   a diffusion layer arranged for covering said polarizer therewith
   wherein said reflective surface layer, said polarizer and said diffusion layer are laminated together to form an integral structure.

4. A reflective type screen comprising;
   a polarizer having a permeation axis extending in the same direction as the polarization direction of an incident light containing a polarized light, said incident light being reflected therefrom to build a projected image,
   a protective layer located in front of said polarizer for protecting said polarizer and adhesively secured to said polarizer, a surface of said protective layer located on the incident side being subjected to diffusion processing, and
   another protective layer located behind said polarizer for protecting said polarizer and adhesively secured to said polarizer, a surface of said another protective layer located on the incident side being subjected to mirror-surface processing
   wherein said polarizer, said protective layer and said another protective layer are laminated together to form an integral structure.

* * * * *